United States Patent
Lu et al.

(10) Patent No.: US 9,531,768 B2
(45) Date of Patent: Dec. 27, 2016

(54) DETECTION OF SHARED CONTENT VIEWED BY ATTENDEES IN ONLINE MEETINGS

(71) Applicant: Cisco Technology, Inc., San Jose, CA (US)

(72) Inventors: Yi Lu, Suzhou (CN); Hua Ouyang, Suzhou (CN); Huahua Yin, Suzhou (CN); Qi Shi, Suzhou (CN); Yunwei Luo, Suzhou (CN)

(73) Assignee: Cisco Technology, Inc., San Jose, CA (US)

( * ) Notice: Subject to any disclaimer, the term of this patent is extended or adjusted under 35 U.S.C. 154(b) by 222 days.

(21) Appl. No.: 13/943,922

(22) Filed: Jul. 17, 2013

(65) Prior Publication Data

US 2015/0026595 A1    Jan. 22, 2015

(51) Int. Cl.
  *G06F 3/048*    (2013.01)
  *H04L 29/06*    (2006.01)
  *G06Q 10/10*    (2012.01)
  *H04N 7/15*    (2006.01)
  *G06F 3/14*    (2006.01)

(52) U.S. Cl.
  CPC .............. *H04L 65/403* (2013.01); *G06Q 10/10* (2013.01); *H04L 65/4015* (2013.01); *G06F 3/1454* (2013.01); *G09G 2370/025* (2013.01); *H04N 7/15* (2013.01)

(58) Field of Classification Search
  CPC .......... H04L 65/403; H04N 7/15; G06Q 10/10
  USPC .................................................. 715/753, 730
  See application file for complete search history.

(56) References Cited

U.S. PATENT DOCUMENTS

| | | |
|---|---|---|
| 6,778,822 B1 | 8/2004 | Visser et al. |
| 6,807,563 B1 | 10/2004 | Christofferson et al. |
| 6,876,734 B1 | 4/2005 | Summers et al. |
| 7,027,577 B2 | 4/2006 | Gourraud et al. |
| 7,085,244 B2 | 8/2006 | Koskelainen et al. |
| 7,151,753 B2 | 12/2006 | Chaney et al. |
| 7,257,090 B2 | 8/2007 | Seavers et al. |
| 7,308,476 B2 | 12/2007 | Mannaru et al. |
| 7,328,239 B1 | 2/2008 | Berberian et al. |
| 7,379,968 B2 | 5/2008 | Schuh |
| 7,412,392 B1 | 8/2008 | Satapathy |
| 7,546,301 B1 | 6/2009 | Balachandran |
| 7,886,001 B2 | 2/2011 | Asthana et al. |
| 2006/0053380 A1* | 3/2006 | Spataro et al. ............... 715/753 |
| 2007/0294623 A1* | 12/2007 | Saavedra ...................... 715/730 |
| 2009/0016512 A1* | 1/2009 | Bryant ................ H04L 12/1822 379/202.01 |
| 2009/0135743 A1* | 5/2009 | Kowalewski ........... H04M 3/56 370/261 |
| 2010/0037151 A1* | 2/2010 | Ackerman et al. ........... 715/753 |

(Continued)

*Primary Examiner* — Ajay Bhatia
*Assistant Examiner* — Phuong Nguyen
(74) *Attorney, Agent, or Firm* — Edell, Shapiro & Finnan, LLC

(57) ABSTRACT

Techniques are presented herein for improving experiences in online meetings that include a plurality of attendee devices, where an attendee device is designated as a presenter. Shared content is provided from the presenter to at least one other attendee device engaged in the online meeting, and an indicator is automatically provided to at least one attendee device regarding whether a condition associated with the presenter providing the shared content has been satisfied.

10 Claims, 12 Drawing Sheets

(56) References Cited

U.S. PATENT DOCUMENTS

2013/0145284 A1* 6/2013 Anantharaman et al. .... 715/753

* cited by examiner

DETECTION OF SHARED CONTENT VIEWED BY ATTENDEES IN ONLINE MEETINGS

TECHNICAL FIELD

The present disclosure relates to sharing of content during online meetings.

BACKGROUND

The use of online meetings for discussions and for the sharing of desktop content has become increasingly important, particularly in global economies where meetings are required including people at great distances from each other.

In many online meeting services, when a meeting attendee (e.g., a host or current presenter) starts to share content with others in an online meeting, there is some portion of time in which there is uncertainty regarding when all attendees (or at least attendees of interest) are currently viewing the shared content. For example, issues such as network delays, bandwidth issues, etc., may present a delay for some attendees to be able to view the shared content. In typical online meetings, it is common for the presenter to communicate with other attendees (e.g., via voice/audio communications and/or instant messaging) to check how many or whether certain attendees can view (or are currently viewing) the content being shared by the presenter.

DESCRIPTION OF EXAMPLE EMBODIMENTS

Overview

Techniques are presented herein for improving experiences in online meetings that include a plurality of attendee devices, where an attendee device is designated as a presenter. Shared content is provided from the presenter to at least one other attendee device engaged in the online meeting, and an indicator is automatically provided to at least one attendee device regarding whether a condition associated with the presenter providing the shared content has been satisfied.

Example Embodiments

As described herein, systems and techniques are described herein that automatically provides an indication to one or more attendees an online meeting information regarding how many and/or which attendees are currently viewing content that is being shared by a presenter of the meeting. This allows, e.g., a presenter to know when would be an appropriate time to begin discussing the shared content in the meeting and further eliminates the need for attendees to communicate with each other to determine which attendees are able to view the shared content.

Figure 1:
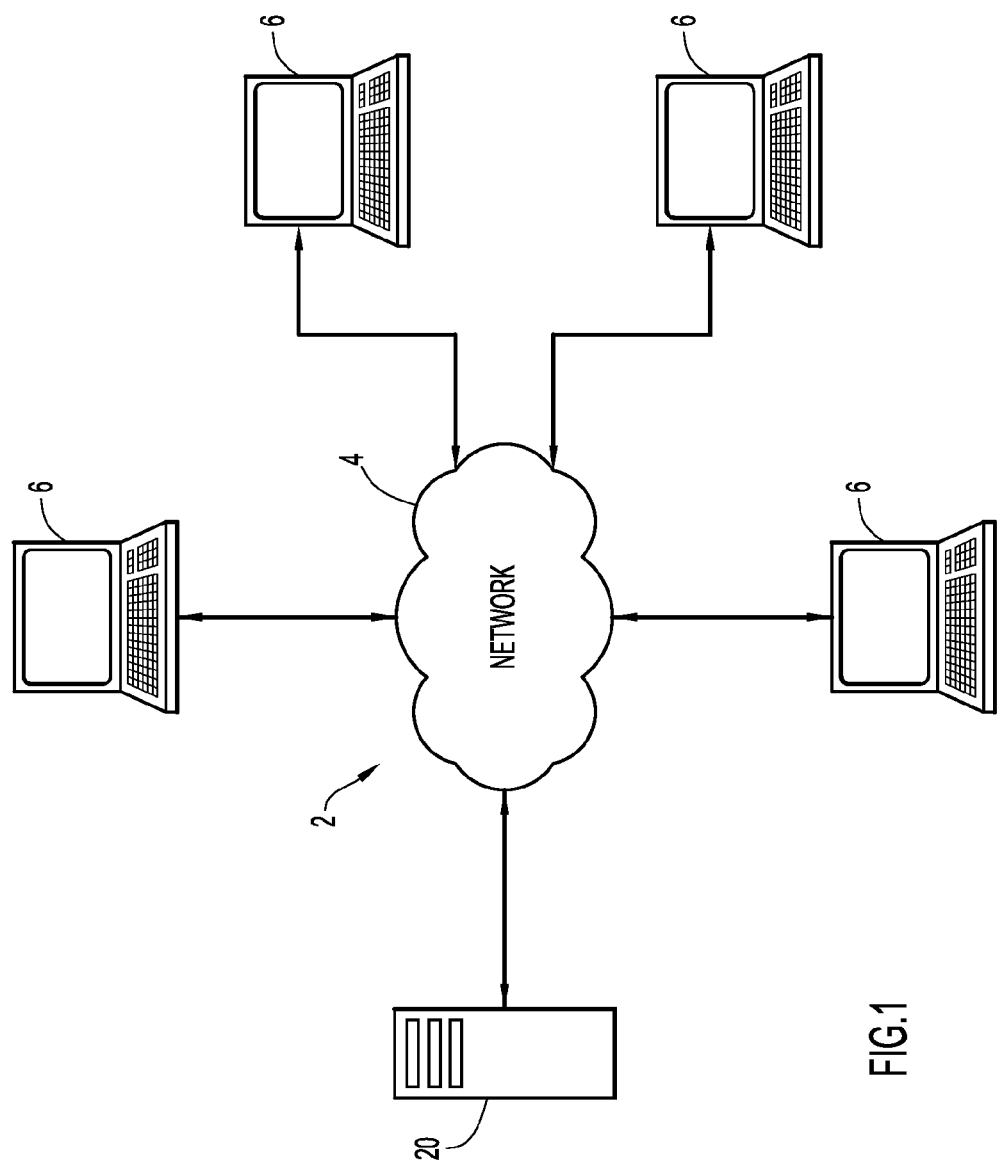
FIG. 1 is a schematic block diagram of an example system that facilitates online meetings between attendee devices that are hosted by at least one server.

An example embodiment of a system that supports online meetings and other types of communications and sharing or exchange of content between attendee devices is depicted in the schematic diagram of FIG. 1. As used herein, the term "online meeting" or "online meeting session" refers to a communication between at least two attendee devices that can include audio and/or video content (e.g., a video meeting, where images of users at different attendee devices are captured and provided to other attendee devices as part of the communication) as well as the sharing of content. The term "shared content", as used herein, refers to any types of content (e.g., sharing of files or documents, such as word processing documents, spreadsheet documents, slide presentations, etc., sharing of images and the sharing of any other types of content), e.g., by a presenter, including desktop sharing of content in which some or all of the display screen at an attendee device designated as a presenter is shared with other attendee devices during the online meeting. In an online meeting session, content is typically shared by attendee at an attendee device that is designated as a presenter within the online meeting session. The presenter designation can change during the course of a meeting session (e.g., when one attendee designated as the presenter has finished speaking and presenting shared content from their attendee device, another attendee in meeting session may decide to present shared content and will then become the next presenter).

Referring to FIG. 1, a system 2 comprises a network 4 that facilitates communications and exchange of communications and sharing of content (e.g., sharing of documents or files, images, video, etc.) between any number of attendee devices 6 via at least one host server device 20. The number of attendee devices 6 and the single host server device 20 depicted in FIG. 1 is for example purposes only, and it is noted that the network 4 can support communications and sharing of content between any suitable number of attendee devices hosted by any suitable number of server devices (e.g., one or more host server devices). Examples of types of networks that can be utilized within system 2 include, without limitation, any one or more of local or wide area networks, Internet Protocol (IP) networks such as intranet or internet networks, telephone networks (e.g., public switched telephone networks), wireless or mobile phone or cellular networks, and any suitable combinations thereof.

Any suitable types of attendee devices 6 may be engaged in an online meeting session at any given time. For example, attendee devices can include any suitable computing device or computing devices, such as personal computer (PC) devices (including stationary or desktop computers, laptops, etc.) or any other suitable types of mobile computing devices (e.g., note pads, tablets, personal data assistant (PDA)

devices, cell phones or smart phones, and any other types of portable media player devices). Each of the attendee devices include suitable processors, input and output (I/O) devices, memory and software as described herein to facilitate communications with other attendee devices over the network 4 and via host server(s) 20, including engaging in online meetings with sharing of content during such meetings, where one or more attendee devices are further configured to be designated as a presenter during such meetings.

Suitable server devices 20 can be any suitable types of stationary or other types of computing devices capable of hosting and managing online meetings and also, optionally, other types of communication sessions between attendee devices 6 (e.g., email, instant messaging or SMS communications, posting of content in blogs or other virtual environments, support of chat rooms, communities or other forms of social networking platforms).

The attendee devices and servers can utilize any suitable operating systems (e.g., Android, Windows, Mac OS, Symbian OS, RIM Blackberry OS, Linux, etc.) to facilitate interaction, communications and sharing of content between attendee devices 6 over the network 4. In addition, the techniques described herein for engaging in online meetings and the sharing of content within such meetings can be implemented utilizing any suitable types of commercial software products and associated services that support such communications and sharing of content between attendee devices. Some examples of software products and associated services with which the techniques described herein can be integrated include, without limitation, WebEx (Cisco Systems, Inc.) and LotusLive (IBM Corporation).

Figure 2:
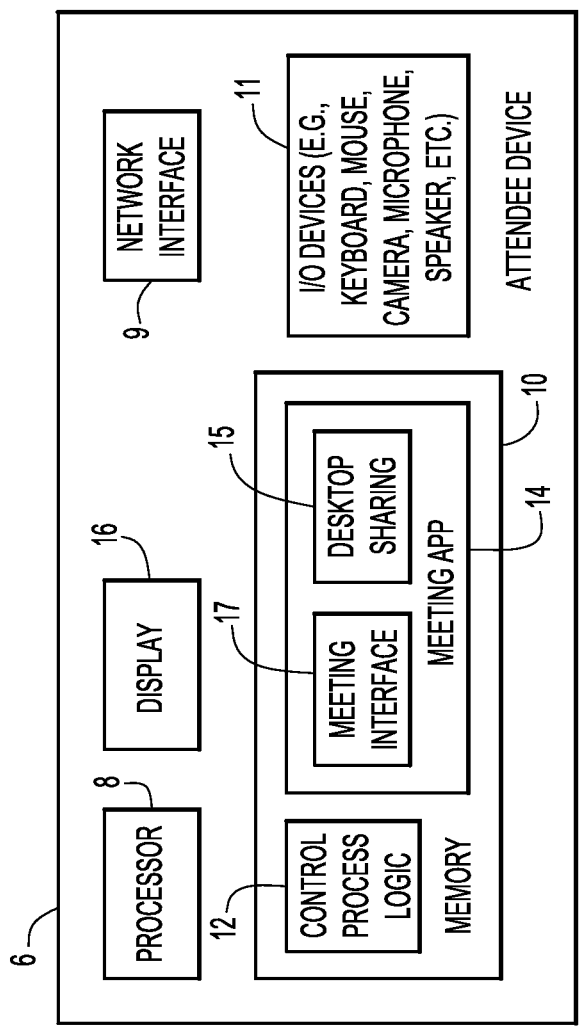
FIG. 2 is a schematic block diagram of an example attendee device that engages in an online meeting with other attendee devices via the system of FIG. 1.

An example embodiment of an attendee device 6 is depicted in the block diagram of FIG. 2. In particular, the attendee device 6 includes a processor 8, a network interface 9, a memory 10, and a display 16 (e.g., LCD or any other suitable type of display screen for displaying video content, images, documents or files and any other types of content). In addition to the display 16, the attendee device also includes any other suitable input and/or output (I/O) devices (depicted generally as box 11) including, without limitation, a keyboard, a mouse (or other suitable input control device, e.g., touch pad or touch screen), a camera, a microphone, speaker(s), etc. The display 16 and other I/O devices 11 allow the attendee device to engage in online meetings, including capturing and transmission of audio and video content by the attendee device (e.g., when the attendee device 6 is a presenter) to and sharing content with other attendee devices 6 over the network 4 during an online meeting as well as receiving audio and video content during the meeting.

The network interface 9 of the attendee device 6 can be, for example, one or more of an Ethernet interface card or switch, a modem, a router or any other suitable hardware device that facilitates a wireless and/or hardwire connection over the network 4 with one or more server devices 20 and other attendee devices 6, where the network interface unit can be integrated within the device or a peripheral that connects with the device.

The memory 10 of the attendee device 6 may comprise read only memory (ROM), random access memory (RAM), magnetic disk storage media devices, optical storage media devices, flash memory devices, electrical, optical, or other physical/tangible memory storage devices, and any combinations thereof. The processor 8 can comprise at least one microprocessor that executes control process logic instructions 12 stored within memory 10 including operational instructions and software applications stored within such memory, including, operation of a meeting application module 14 as described herein. Thus, in general, the memory 10 may comprise one or more tangible (non-transitory) computer readable storage media (e.g., a memory device) encoded with software comprising computer executable instructions and when the software is executed (by the processor 8) it is operable to perform the operations described herein in connection with the meeting application module 14 for determination and display of indicators relating to how many and/or which attendee devices in an online meeting are currently viewing shared content.

Figure 3:
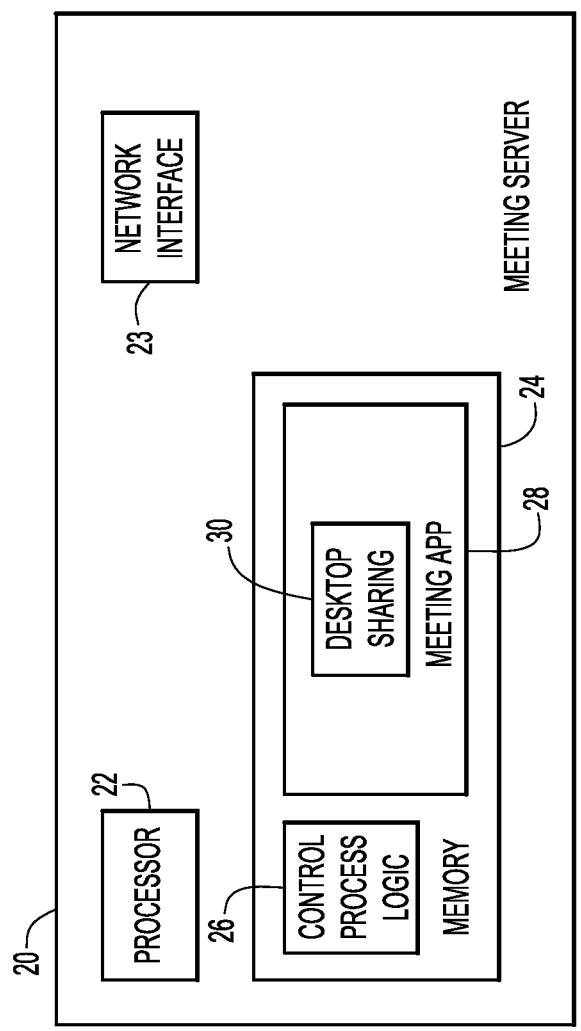
FIG. 3 is a schematic block diagram of an example embodiment of a server that hosts online meeting for the system of FIG. 1.

An example embodiment of a meeting server 20 that can be used in the system 2 of FIG. 1 is depicted in the block diagram of FIG. 3. Server 20 includes a processor 20, a network interface 23, and a memory 24 including control process logic 26 and other suitable software for performing operations in relation to the techniques described herein. The processor 20, network interface 23 and memory 24 for the meeting server 20 can be of the same or similar types and have the same or similar functionalities as previously described herein in relation to the attendee device 6.

The memory 10 of each attendee device 6 includes a meeting application module 14 that comprises one or more software applications that facilitate online meetings and/or other types of communications with other attendee devices 6 over the network, where the online meetings are hosted by the host meeting server(s) 20. Each meeting server 20 also includes a meeting application module 28 that facilitates hosting by the meeting server 20 of online meetings, including sharing of content between attendee devices 6 (where an attendee device 6 designated at a presenter shares content with other attendee devices 6 in the meeting), as well as other types of communication over a suitable software platform (e.g., via a Cisco WebEx software platform, a LotusLive software platform or any other suitable software platform).

The meeting application module 14 of the attendee device 6 includes a desktop sharing indication module 15 including one or more software applications that facilitate sharing of desktop content and/or applications with other attendee devices during the meeting. The desktop sharing module 15 further determines an indication of which attendee devices during the meeting are currently viewing shared content and also provides a status indication to other attendee devices that the attendee device 6 is currently viewing shared content in accordance to techniques described herein. The meeting application module 14 further includes a meeting interface module 17 comprising one or more software applications that provide an interactive interface for a user/attendee operating the attendee device 6 to control certain features and operations within the online meeting, including the option to view available shared content within a meeting, the option of designating a presenter, and the option of sharing content originating from the attendee device 6 with other attendee devices in the meeting. Example embodiments of a meeting interface that is presented by a display 16 of the attendee device 6 utilizing the meeting interface module 17 during an online meeting session are depicted in FIGS. 5-8.

The meeting application module 28 of the host server device 20 also includes a desktop sharing module 30 comprising one or more software applications that facilitate determination and/or communication of indicators to attendee devices within the online meeting relating to how many or which particular attendee devices are currently viewing shared content.

It is noted that the software modules for each of the attendee device 6 and the server device 20 can be integrated with each other in any suitable manner (e.g., one or more software applications can perform the operations of both the desktop sharing module 15 and the meeting interface module 17 for the meeting application module 14 of the attendee device 6).

Figure 4:
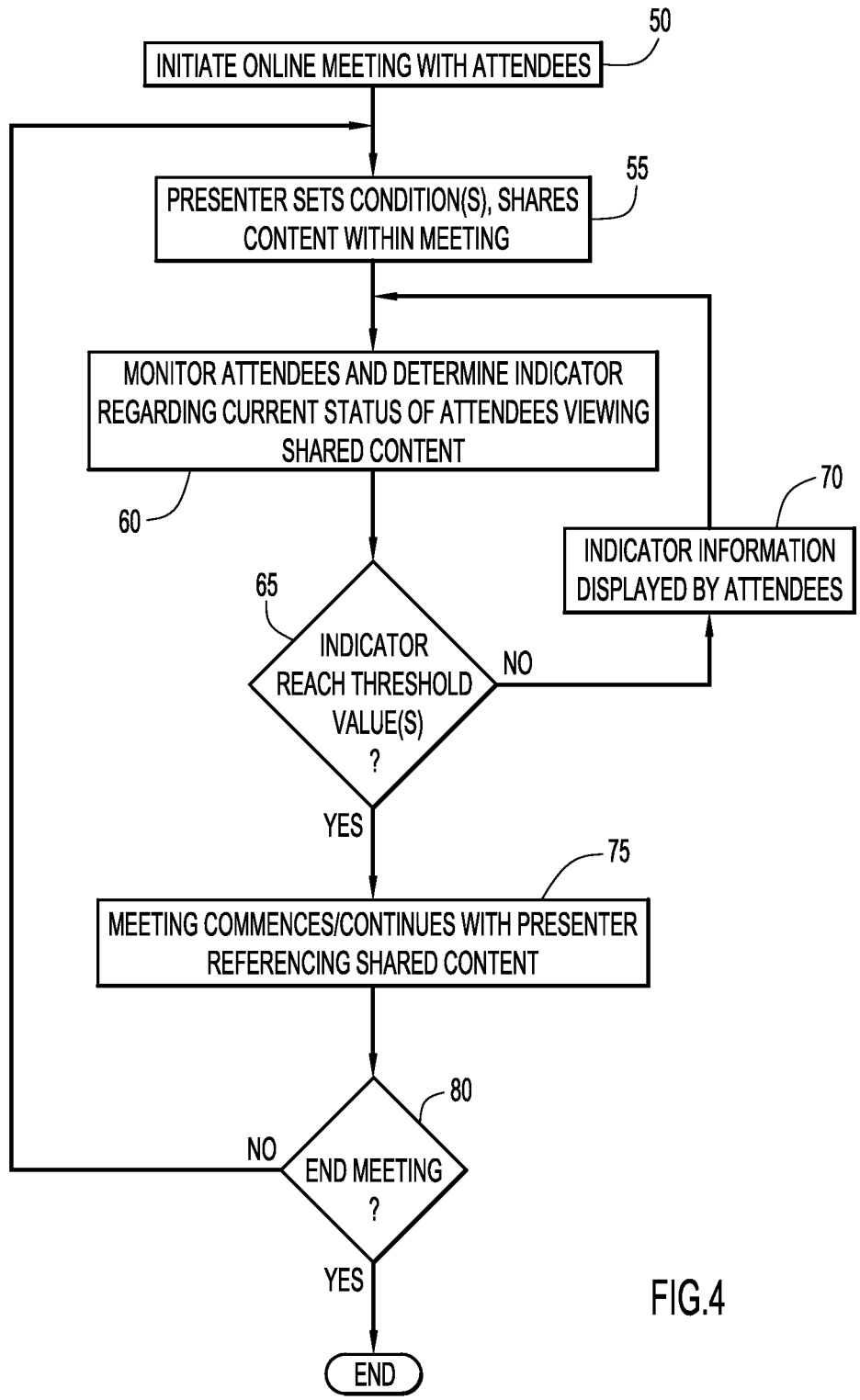
FIG. 4 is a flow chart depicting an example process for providing an indicator to the presenter which attendees are viewing shared content for an online meeting session using the system of FIG. 1 and in accordance with techniques described herein.

An example embodiment of a process for detection of shared content that is currently being viewed by attendee devices during an online meeting is now described with reference to the flow chart of FIG. 4. At 50, an online meeting is initiated between any selected number of attendees. The online meeting can be initiated in any suitable manner utilizing any suitable online meeting software platform as previously described herein (e.g., Cisco WebEx), where potential attendees are notified in advance via, e.g., an email communication, instant messaging, a calendaring function or any other suitable communication that provides an invitation to join the meeting as well as suitable connection information (e.g., an HTML link or other suitable connection, providing meeting and password information, etc.). Attendee devices 6 engage in the meeting utilizing meeting application modules 14, where a host server 20 (or one or more host servers 20) hosts the online meeting session between the attendee devices utilizing meeting application module 28. At the start of a meeting, an attendee device 6 is designated as a presenter that will be speaking in the meeting and may further be presenting shared content (i.e., content that originates from the attendee device of the presenter) to the other attendee devices. For example, the presenter may be the person who set up the meeting (e.g., the person who sent a meeting invite to other attendees). As previously noted, the presenter may first be designated ash a first person at a first attendee device 6, where the online meeting session may then evolve such that another presenter is designated at a second attendee device 6 (where the next presenter may then also share content with others from the second attendee device 6), and so on throughout the online meeting session.

At 55, the designated presenter sets one or more conditions relating to the sharing of content and provides content to be shared to the other attendees. In particular, the presenter, using the meeting interface module 17, which displays an interactive user interface 31 as depicted, e.g., in FIG. 5, selects to share content (e.g., by selecting an appropriate interactive icon within a menu bar 32 provided in user interface 31). The content to be shared can be desktop sharing at the presenter's attendee device 6 (e.g., all content appearing in the display 16 of the attendee device, or only some content including one or more selected applications being displayed in the display 16 of the attendee device). During the process step 55 of selecting content to share from the presenter's attendee device 6 with other attendees engaged in the online meeting, the presenter also selects one or more conditions that must be satisfied before a discussion associated with the shared content commences. In other words, the meeting is paused, where no discussion in relation to the shared content occurs until the one or more conditions have been satisfied. In addition, the other attendee devices 6 may be prevented from displaying the shared content until the one or more conditions have been satisfied.

Some examples of conditions to which information is tracked that may be selected include a number of attendees that are currently viewing the shared content, a percentage of attendees that are currently viewing the shared content (where the percentage can be based, e.g., upon a total number of actual attendees currently engaged in the online meeting session or upon a total number of attendees invited to join the online meeting session,) a selection of one or more specific attendees that must be viewing the shared content, a specified time period from the start of sharing content at which the presenter will commence with the meeting, etc. The presenter can make a selection of one or more condition criteria, e.g., via the user interface 31.

At 60, attendees currently engaged in the online meeting are monitored to determine information that provides an indicator to one or more attendees regarding which attendees are able to view the shared content and also whether or to what extent the condition or conditions are being met or satisfied. The monitoring can occur at one or both of the presenter's attendee device 6 and a server 20, utilizing the desktop sharing module 15 and/or module 30.

Figure 9:
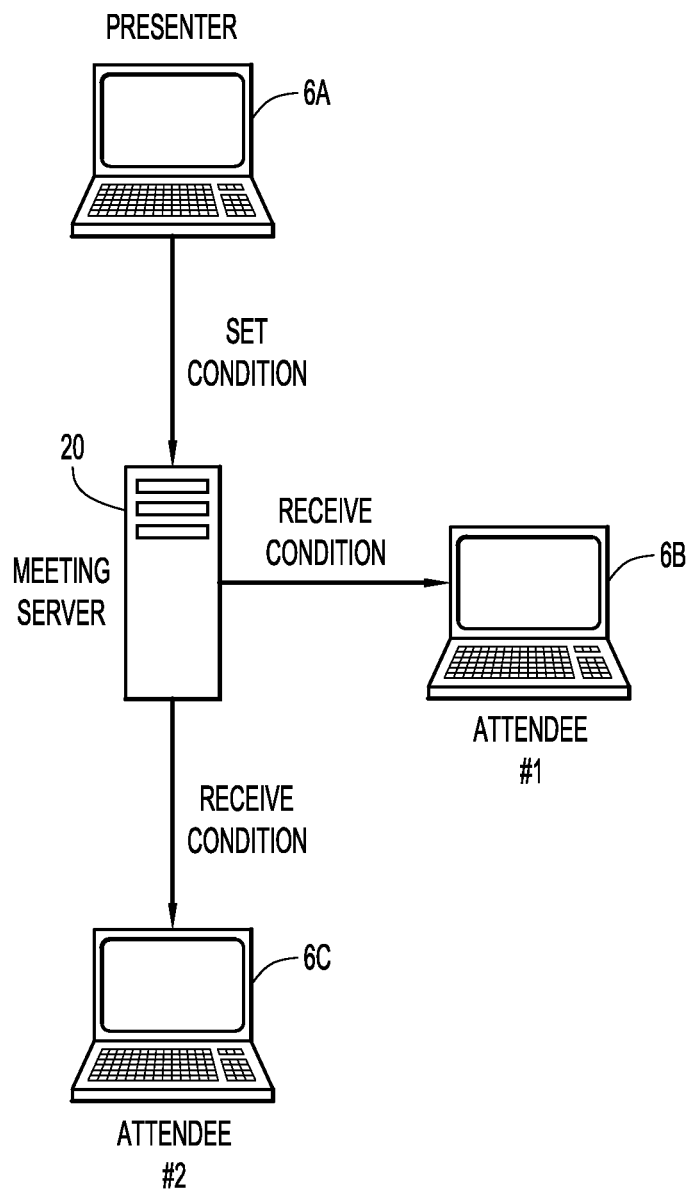
FIGS. 9-12 depict an ongoing online meeting session utilizing the system of FIG. 1 in which attendee devices communicate status information regarding viewing of shared content to other attendee devices in accordance with techniques described herein.
Figure 10:
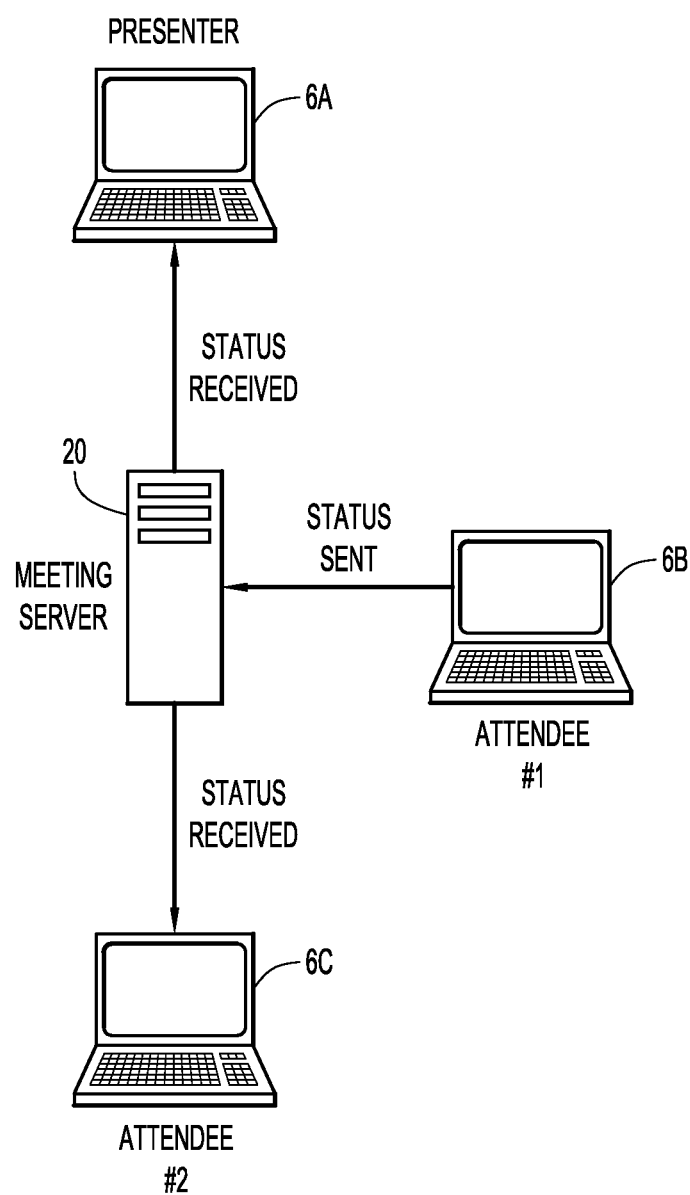
Figure 11:
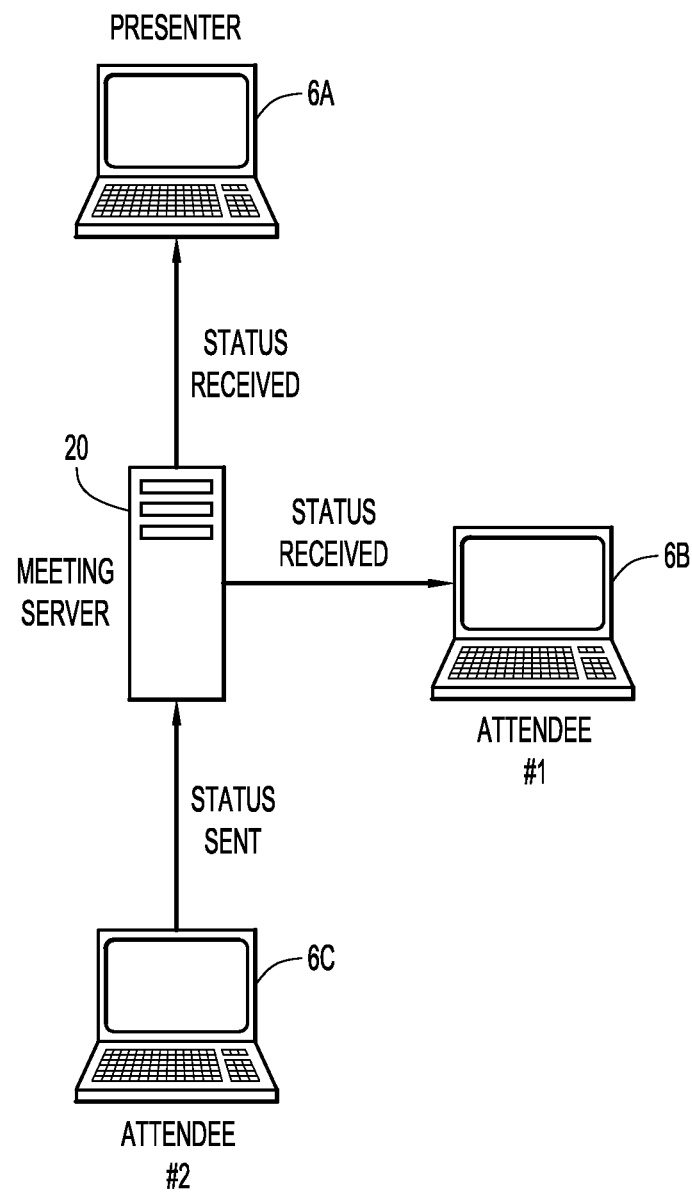
Figure 12:
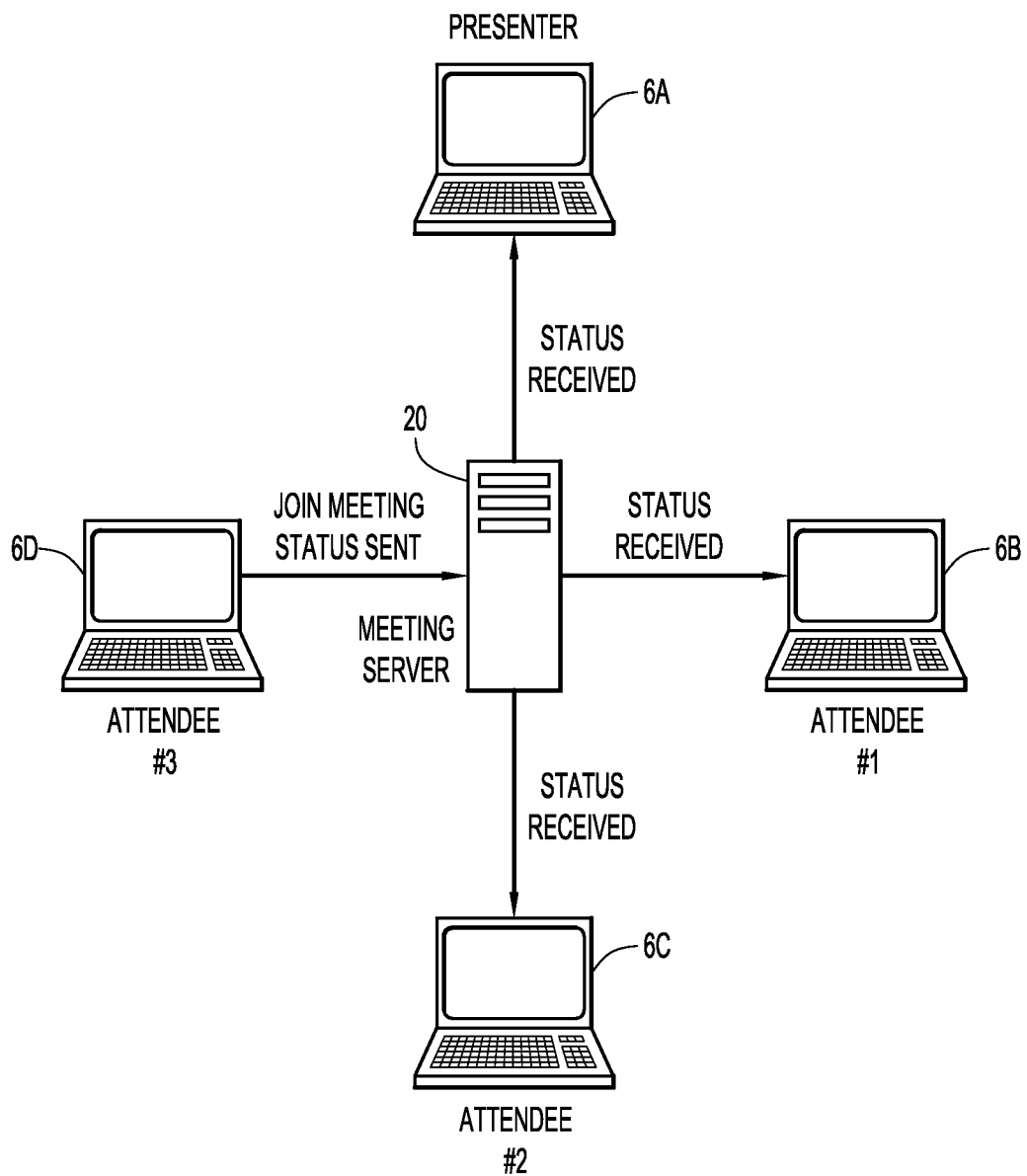

Monitoring at 60 is facilitated by each attendee device providing one or more notifications of its status to the server and/or at least one other attendee device currently engaged in the online meeting. Referring to FIGS. 9-12, an example embodiment is depicted in which initially three attendee devices 6A-6C are engaged in an online meeting session supported by host meeting server 20, where another attendee device 6D joins at a later time (as indicated in FIG. 12). For example, as depicted in FIG. 9, the presenter is currently designated as attendee device 6A. The presenter at attendee device 6A selects shared content and sets one or more conditions, where the one or more conditions are provided to the meeting server 20, which can also be forwarded to other attendee devices 6B, 6C. When an attendee device 6B selects to view shared content that is being provided by the presenter attendee device 6A, a status notification that the attendee device 6B is viewing shared content is provided to the server 20 and to at least the presenter attendee device 6A (where the status indication also identifies or defines the specific attendee device and thus also defines a designated attendee). In the embodiment of FIG. 10, all attendee devices 6A, 6C are provided with the notification status from attendee device 6B. A similar notification is provided as depicted in FIG. 11 from attendee device 6C to the server 20 and the other attendee devices 6A, 6B when this attendee device selects to view shared content. When an attendee device 6D joins the online meeting session, as depicted in FIG. 12, a notification is sent to the server 20 and all other attendee devices 6A-6C that the new attendee has joined the meeting, where an indication can also be provided that the attendee device 6D has also selected to view the shared content.

The selection to receive shared content at an attendee device 6 can be implemented in any suitable manner, such as via a user interface display (e.g., any of the user interfaces depicted in FIGS. 5-8) provided by the meeting interface module 17 (e.g., the attendee device 6 receives a notice through its meeting user interface that the presenter is sharing content, and the attendee device 6 selects to receive the shared content). It is noted that, when an attendee device 6 provides a notification status that it is currently viewing shared content, the status indication that the attendee device 6 is viewing shared content represents that the shared content is either currently being viewed (e.g., if allowed by the system 2 even when one or more conditions are not met) or is capable of being viewed (e.g., the attendee device 6 has received the shared content for display and it is capable of viewing such shared content after one or more conditions by the presenter have been met).

The indicator determined at 60 represents information regarding which and/or how many attendees are currently viewing shared content and/or a degree or representation of a criteria that must occur in or for one or more conditions to be satisfied, where the indicator is based upon the status indications provided by attendee devices 6. The indicator can be determined by any attendee device 6 and/or server 20 within the system 2. For example, the presenter attendee device 6, utilizing the desktop sharing module 15 of its meeting application module 14, can determine one or more indicator values based upon the status indication information it receives as well as the one or more conditions set by the presenter during the online meeting session. Alternatively, the server 20, utilizing the desktop sharing module 30 of its meeting application module 28, can also determine one or more indicator values based upon the received status indication information received from attendee devices 6 as well as the one or more conditions set by the presenter.

The indicator values determined at 60 can be any type of information that utilizes the status indication information provided by attendee devices in relation to viewing shared content. For example, indicator values can represent a percentage or number of attendees currently engaged in the online meeting that are currently viewing or capable of viewing shared content, a percentage or number of attendees that still need to view shared content or be capable of viewing shared content, a specific listing of attendees who are viewing shared content (or capable of viewing shared content), a specific listing of attendees who have not yet viewed the shared content (or who are not yet capable of viewing the shared content).

At 65, a determination is made regarding whether the indicator representing information regarding which and/or how many attendees are currently viewing shared content meets one or more threshold values associated with the one or more conditions set by the presenter. For example, in a scenario in which the presenter requires at least a certain percentage (e.g., 50% or more) of attendees have provided a status indication of viewing shared content, the indicator would need to be at least this percentage value or greater in order for the condition to be met. In another example, if a condition is set by the presenter that at least Attendee 1 and Attendee 2 must be viewing content (or capable of viewing content), the indicator would need to represent that both of the attendee devices 6 associated with Attendee 1 and Attendee 2 provided a status indication of viewing content. The determination at 65 can be made by the server 20 and/or presenter attendee device 6.

Figure 5:
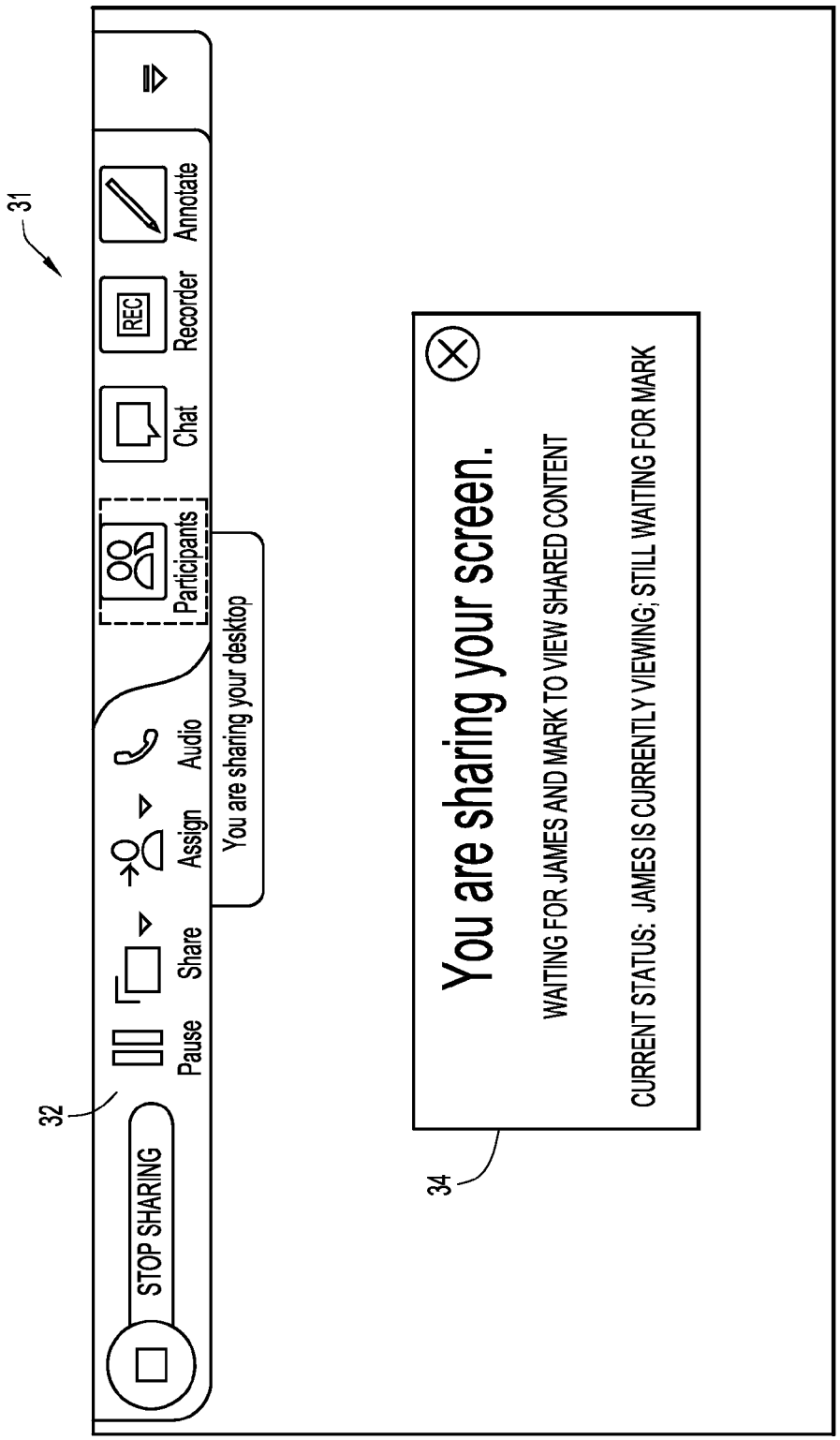
FIGS. 5-8 depict meeting interfaces for attendee devices for the system of FIG. 1, where the interfaces provide indicator information regarding attendees currently viewing shared content.
Figure 6:
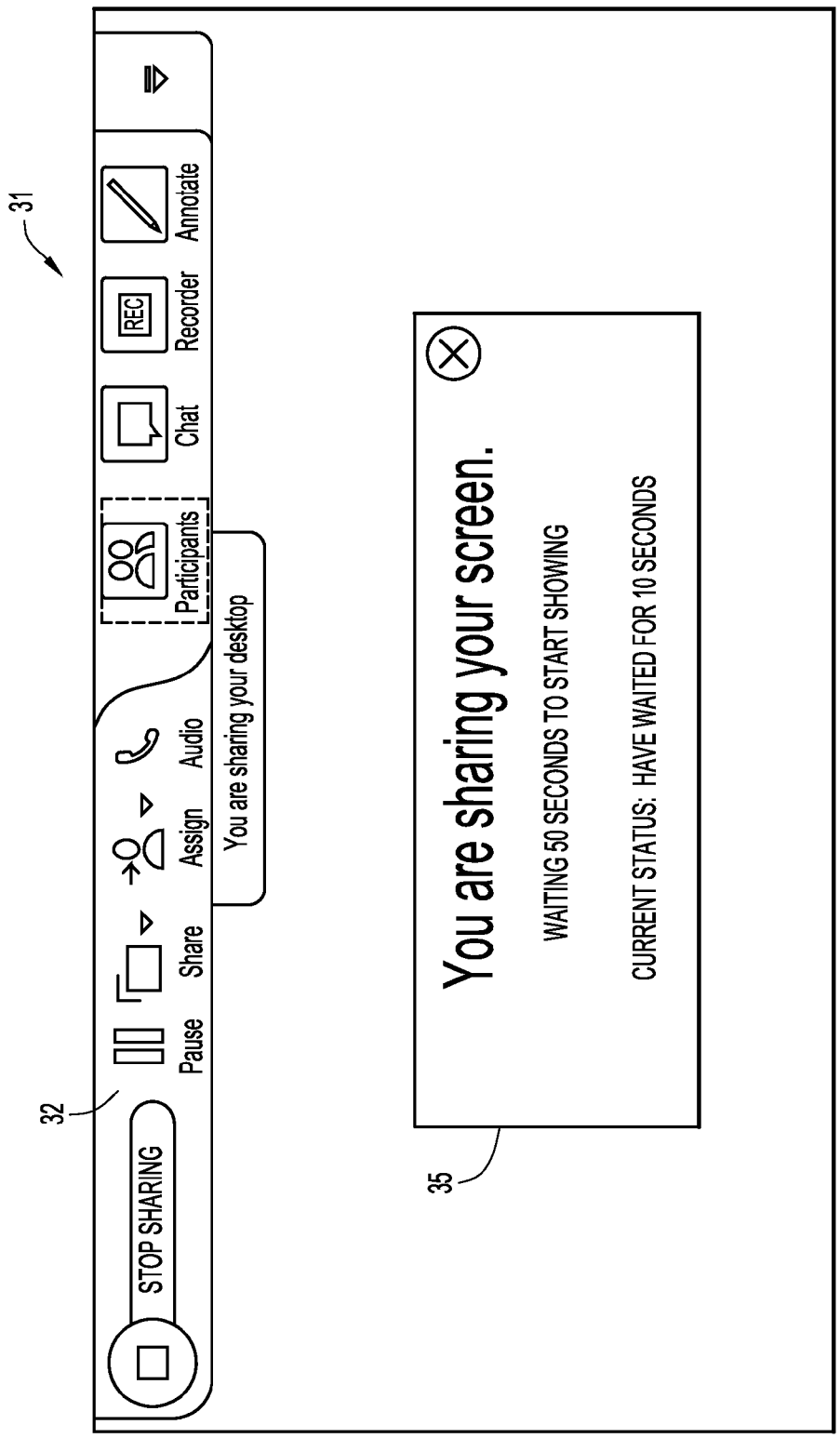
Figure 7:
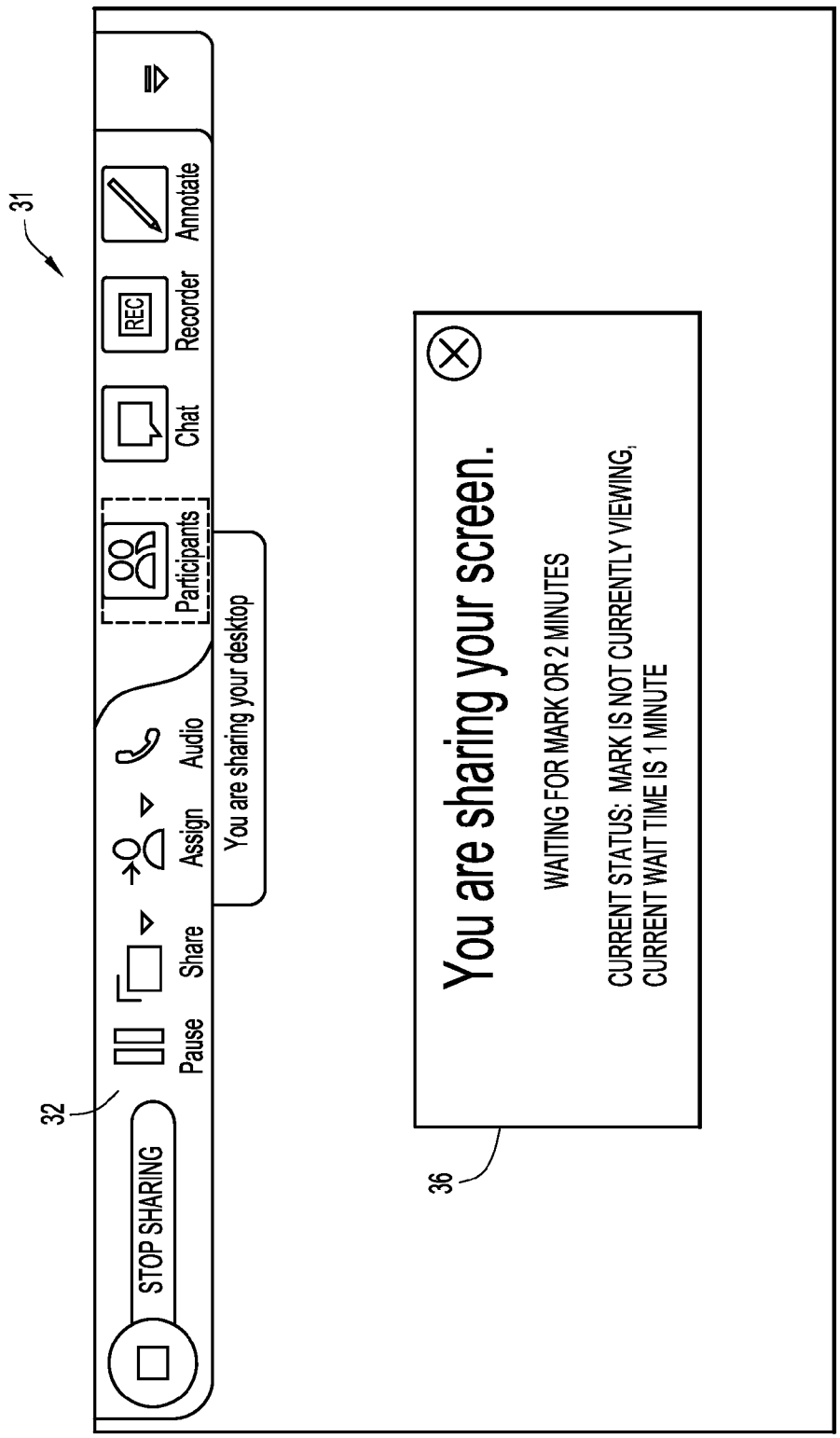

At 70, in response to at least one threshold value not being met or satisfied, indicator information is displayed at one or more attendee devices 6. The indicator information can be determined, e.g., by the presenter attendee device 6 and/or the server 20, where such indicator information is then provided to some or all of the other attendee devices. Indicator information can also be determined at one or more attendee devices 6 (based upon the status indication information provided for other attendee devices to each attendee device). Examples of indicator information that can be displayed at a presenter attendee device 6 (e.g., attendee device 6A as depicted in FIGS. 9-12) is shown in FIGS. 5-7. In the embodiment of FIG. 5, an interactive user interface 31 is displayed at the attendee device 6 of the presenter that includes an indicator 34. The indicator 34 provides an indication that the presenter is currently sharing content, information about a condition required before the meeting can progress ("Waiting for James and Mark to view shared content"), a status indication that one or more certain attendees (e.g., James) are currently viewing the shared content, and that one or more other attendees (e.g., Mark) still have not provided a status indication that they are viewing the shared content.

Another example embodiment of an interactive user interface 31 for the presenter is depicted in FIG. 6, in which the indicator 35 provides an indication that the presenter is currently sharing content, information about a countdown condition required before the meeting can progress ("Waiting for 50 seconds to commence meeting"), and a current status indication of the amount of time elapsed or time until commencement or progression of the meeting (e.g., "have waited for 10 seconds").

A further example embodiment of an interactive user interface 31 for the presenter is depicted in FIG. 7, in which the indicator 36 provides an indication that the presenter is currently sharing content, information about two conditions required before the meeting can progress ("Waiting for Mark or 2 minutes"), and one or more corresponding status indications (e.g., "Mark is not currently viewing" and a countdown indicator of "Current wait time is 1 minute").

Figure 8:
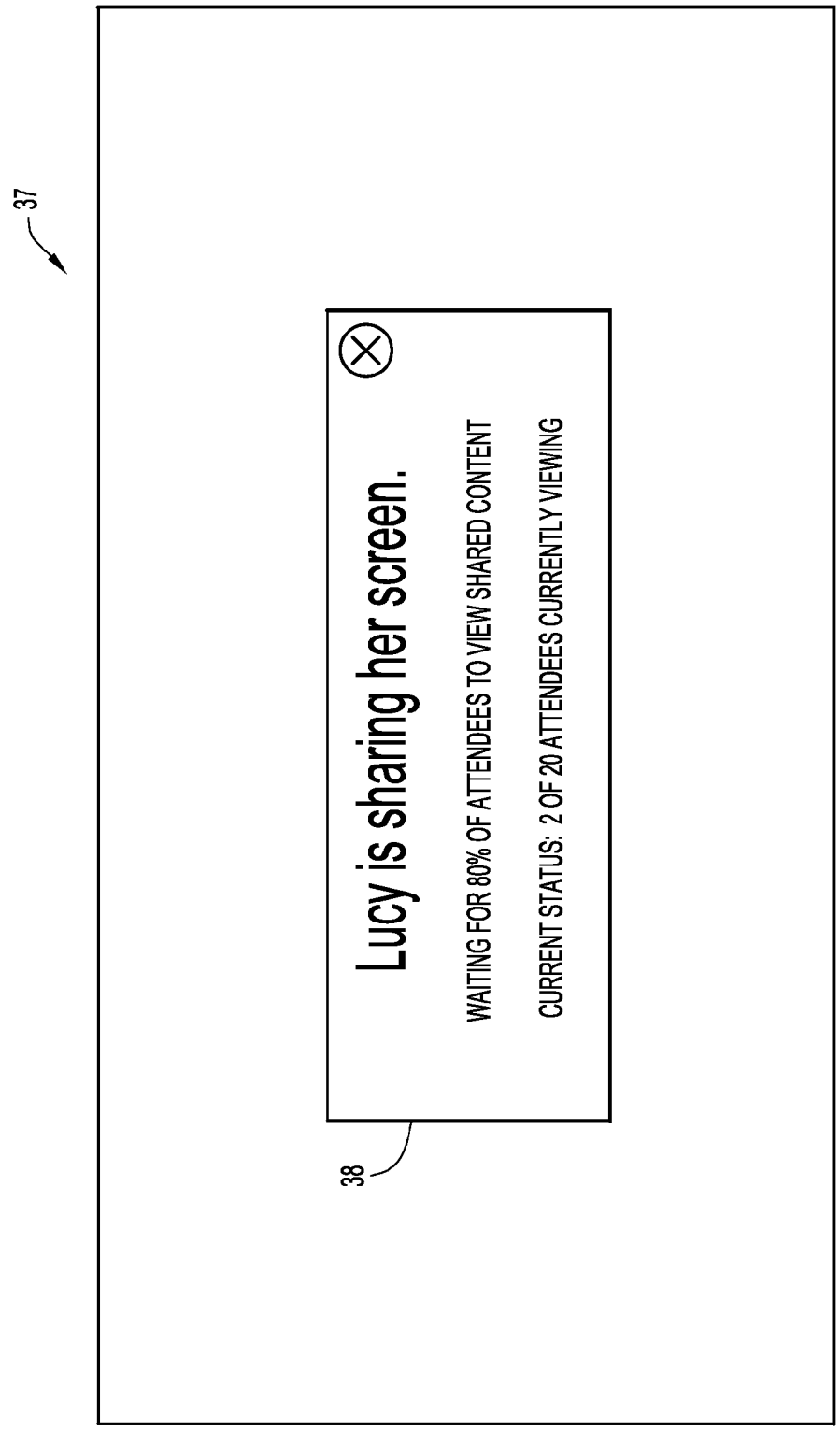

The other attendee devices 6 that are not the presenter (e.g., attendee devices 6B, 6C and 6D as depicted in FIGS. 9-12) can also be provided with a status indication in an interactive user interface. An example embodiment is depicted in FIG. 8, in which an interactive user interface 37 for an attendee device 6 includes an indicator 38 providing an indication that the presenter (e.g., Lucy) is currently sharing content, information about a condition regarding how many attendees need to provide an indication that they are viewing shared content before the meeting will commence or progress ("Waiting for 80% attendees to view shared content"), and an indication regarding how many attendees have provided a status indication that they are viewing shared content ("2 of 20 attendees currently viewing").

Thus, the system 2 is configured such that each attendee device 6 (presenter and non-presenter) is provided with an indication regarding the viewing of shared content by other attendee devices and/or when the meeting will continue or progress, e.g., based upon a countdown timer or a listing of a condition and to what degree the status is at of attendees who are currently engaged in the online meeting session in relation to the condition. After providing an indication at 70, the process is repeated at 60 in which monitoring status indications of attendees continues.

As previously noted herein, one or more attendee devices 6, upon selecting to view shared content, may be permitted to start viewing the shared content or may be required to wait to view shared content until the one or more conditions are met. For example, when not allowed to view shared content until the one or more conditions are met, an attendee device may simply be provided with the indicator (e.g., indicator 38 in interface 37 as depicted in FIG. 8) without a display of the shared content at the display 16 of the attendee device 6. Alternatively, an attendee device 6 may be permitted to view the shared content at the display 16 of the attendee device 6 but also with the indicator (e.g., indicator 38) showing that the presenter is still waiting until at least one condition is met before proceeding/commencing with the meeting.

At 75, in response to at least one (and preferably each) condition being satisfied (where the indicator value(s) meet or exceed the threshold value(s)), the meeting is no longer paused but instead continues with the presenter discussing shared content. The indicator messages (e.g., indicators 34, 35, 36 and 38) in the user interactive interfaces for attendee devices 6 are no longer displayed and the shared content is displayed at attendee devices 6.

At 80, after the presenter has completed a presentation with currently viewed shared content, a determination is made whether to continue the meeting. If the meeting continues, the process repeats at 55, with the designation of a new presenter and/or new content to be shared in the meeting.

The techniques described herein allow presenters of shared content in online meetings to have an accurate indication of how many and/or precisely which attendees of a meeting have provided an indication that they are currently viewing shared content. This avoids the need for the presenter to query attendees to find out who may or may not be able to view the shared content before proceeding with a discussion of the shared content. Other attendees (i.e., attendees other than the presenter) can also be provided with an indication of the condition(s) required and current attendee status as a notification of when the meeting will commence (e.g., as soon as an attendee is viewing shared content, or as soon as a particular time period has elapsed). All of these features provide an enhanced meeting experience for attendees within an online meeting in which content is being shared.

The status indications relating to attendee devices that have selected to view shared content can be sent to all attendee devices and the server (as depicted in FIG. 9-12) or, alternatively to only the server and/or the presenter attendee device. Thus, indications or notifications that are displayed by attendee devices regarding information about shared content can be based upon information determined and provided by the presenter, by the server, or by each attendee device.

The above description is intended by way of example only.

What is claimed is:

1. A method comprising:
   in an online meeting including a plurality of attendee devices, wherein an attendee device is designated as a presenter, providing shared content from the presenter to at least one other attendee device engaged in the online meeting;
   providing, at an attendee device, an option to select a plurality of conditions from a list of conditions that must be satisfied prior to commencing the online meeting, wherein commencing the online meeting includes facilitating viewing of the shared content from the presenter by other attendee devices engaged in the online meeting, and the list of conditions includes a minimum number of attendees or a minimum percentage of attendees that must be engaged in the online meeting before commencement of the meeting, a selection of one or more specific attendees that must be engaged in the online meeting before commencement of the meeting, and a specified time period that must elapse before commencement of the meeting;
   automatically providing an indicator to at least one attendee device regarding whether one or more of the plurality of selected conditions has been satisfied;
   via a computing device, automatically pausing the online meeting until at least one of the plurality of selected conditions has been satisfied, wherein the pausing includes automatically displaying a message to the at least one attendee device of the indicator; and
   in response to the at least one of the plurality of selected conditions being satisfied, automatically un-pausing the online meeting, wherein the un-pausing includes removing the display of the indicator so as to facilitate commencing the meeting.

2. The method of claim 1, further comprising:
   preventing display of the shared content for the at least one attendee device until the at least one of the plurality of selected conditions is satisfied.

3. The method of claim 1, wherein the displayed message includes a listing of the selected conditions and a representation of criteria to occur for each condition to be satisfied.

4. The method of claim 1, wherein the online meeting is automatically paused until the plurality of selected conditions have been satisfied, and, in response to the plurality of selected conditions being satisfied, the online meeting is automatically un-paused.

5. An apparatus comprising:
   a memory configured to store instructions including one or more applications that support online meetings with attendee devices over a network;
   a display for displaying shared content during an online meeting;
   a network interface unit configured to enable communications over a network; and
   a processor configured to execute and control operations of the one or more applications so as to:
      provide an option to select a plurality of conditions from a list of conditions that must be satisfied prior to commencing the online meeting, wherein commencing the online meeting includes facilitating viewing of the shared content by the apparatus engaged in the online meeting, and the list of conditions includes a minimum number of attendees or a minimum percentage of attendees that must be engaged in the online meeting before commencement of the meeting, a selection of one or more specific attendees that must be engaged in the online meeting before commencement of the meeting, and a specified time period that must elapse before commencement of the meeting;
      in response to a presenter within the online meeting providing the shared content, providing an indicator to the apparatus regarding whether one or more of the plurality of selected conditions has been satisfied;
      pausing the online meeting until the at least one of the plurality of selected conditions has been satisfied, wherein the pausing includes automatically displaying a message to the apparatus of the indicator; and
      in response to the at least one of the plurality of selected conditions being satisfied, un-pausing the online meeting, wherein the un-pausing includes removing the display of the indicator so as to facilitate commencing the meeting.

6. The apparatus of claim 5, wherein the processor is further configured to execute and control operations of the one or more applications so as to prevent display of the shared content for the apparatus until the at least one of the plurality of selected conditions is satisfied.

7. The apparatus of claim 5, wherein the displayed message includes a listing of each selected condition and a representation of criteria to occur for the condition to be satisfied.

8. One or more non-transitory computer readable storage media encoded with software comprising computer executable instructions and when the software is executed operable to:
   provide, at an attendee device, an option to select a plurality of conditions from a list of conditions that must be satisfied prior to commencing an online meeting between a plurality of attendee devices, wherein commencing the online meeting includes facilitating viewing of shared content by an attendee device engaged in the online meeting, and the list of conditions includes a minimum number of attendees or a minimum percentage of attendees that must be engaged in the online meeting before commencement of the meeting, a selection of one or more specific attendees that must be engaged in the online meeting before commencement of the meeting, and a specified time period that must elapse before commencement of the meeting;

in the online meeting, provide shared content from an attendee device designated as a presenter to at least one other attendee device engaged in the online meeting;

provide an indicator to at least one attendee device regarding whether one or more of the plurality of selected conditions has been satisfied;

pause the online meeting until the at least one of the plurality of selected conditions has been satisfied, wherein the pausing includes automatically displaying a message to the at least one attendee device of the indicator; and in response to the at least one of the plurality of selected conditions being satisfied, un-pausing the online meeting, wherein the un-pausing includes removing the display of the indicator so as to facilitate commencing the meeting.

9. The one or more computer readable storage media of claim 8, wherein the instructions are further operable to:

prevent display of the shared content for the at least one attendee device until the at least one of the plurality of selected conditions is satisfied.

10. The one or more computer readable storage media of claim 8, wherein the displayed message includes a listing of each selected condition and a representation of criteria to occur for the condition to be satisfied.

* * * * *